United States Patent [19]

Hosoya et al.

[11] Patent Number: 4,853,920
[45] Date of Patent: Aug. 1, 1989

[54] INFORMATION RECORDING MEDIUM AND REPRODUCING METHOD THEREFOR

[75] Inventors: Hideki Hosoya, Yokohama; Akio Aoki, Tokyo; Masahiko Enari, Yokohama, all of Japan

[73] Assignee: Canon Kabushiki Kaisha, Tokyo, Japan

[21] Appl. No.: 170,030

[22] Filed: Mar. 22, 1988

Related U.S. Application Data

[63] Continuation of Ser. No. 830,747, Feb. 19, 1986, abandoned.

[30] Foreign Application Priority Data

Feb. 20, 1985 [JP] Japan .................................. 60-31867

[51] Int. Cl.$^4$ ............................ G11B 7/00; G11B 5/09
[52] U.S. Cl. .......................................... 369/59; 360/40
[58] Field of Search ..................................... 360/43, 40

[56] References Cited

U.S. PATENT DOCUMENTS 3,864,735  2/1975  Davis et al. ............................ 360/43
3,940,790  2/1976  Conroy et al. ........................ 360/41
4,566,092  1/1986  Gerard et al. ........................ 369/59

*Primary Examiner*—Vincent P. Canney
*Attorney, Agent, or Firm*—Fitzpatrick, Cella, Harper & Scinto

[57] ABSTRACT

An information reproducing medium comprises plural tracks for recording information arranged to form a band and such plural bands are arranged normal to the direction of the track arrangement. The track has no area for obtaining an information reproducing clock. In a reproducing method, when information on one track of one band is to be reproduced, an information reproducing clock is derived from at least a portion of information on a track other than the one track, preferably a track adjacent thereto.

6 Claims, 5 Drawing Sheets

INFORMATION RECORDING MEDIUM AND REPRODUCING METHOD THEREFOR

This application is a continuation of application Ser. No. 830,747 filed Feb. 19, 1986, now abandoned.

BACKGROUND OF THE INVENTION

The present invention relates to an information recording medium having information recorded thereon by a self-clocking modulation system which necessitates an area for producing an information reproducing clock, and a reproducing method therefor.

Many optical recording and reproducing apparatus which use recording media such as optical files or compact disks have been recently proposed, and cardlike optical recording media (optical card) which are more convenient to carry and have higher memory capacities per area than those recording media. Methods for utilizing such optical cards have also been proposed.

FIG. 1 is a plan view showing a record format of a prior art optical card, and FIG. 2 is a partial enlarged view thereof.

In FIGS. 1 and 2, a record area 2 is provided on an optical card 1 which is the recording medium. The record area 2 has a plurality of bands 3. Each of the bands 3 has a plurality of tracks 4 and each of the tracks 4 has several tens to one hundred bits of information capacity. The bands are separated by a reference line (R line) 5. An arrow A shows the direction of movement of the optical card 1 in the reproduction mode.

FIG. 3 shows a schematic configuration of an optical card reproducing apparatus.

In FIG. 3, the optical card 1 is movable in the direction of an arrow A by a rotation mechanism 6. The information recorded on the optical card 1 is read by an optical head 11 and reproduced track by track. A light from a light source 7 such as an LED is condensed by a lens system 8 to illuminate the track 4 on which the information is recorded, an image of the illuminated track 4 is focused onto a linear sensor array 10 by a focusing optical system 9 and the sensor array 10 produces an electrical signal representing the information recorded on the track 4. After the track 4 has been read, the optical card 1 is moved in the direction of the arrow A or the optical head 11 is moved across the bands 3 (in a direction of an arrow C) and the information on the next track is read.

Where the information on the track 4 is recorded by the NRZ (non-return to zero) system in which information "1" represents the presence of bit and information "0" represents the absence of bit, it is impossible to self-clock, that is, take out a clock signal (or demodulate without the clock signal) in the reproduction mode. Thus, the information must be reproduced by using a fixed clock such as a drive clock for the sensor array 10.

As a result, the size of the image of the track 4 focused onto the sensor array 10 is very important. Accordingly, it is necessary to precisely adjust the positional relationship of the optical card 1, focusing optical system 9 and sensor array 10 so that the desired image is focused on the sensor array 10. A high precision focusing optical system 9 is also required. As a result, the cost of the apparatus increases.

The above problems may be resolved if a self-clocking modulation system such as MFM, EFM, 4/5 NRZI or FM is used. However, when the information is recorded by such a self-clocking modulation system, the following problems are encountered.

In the modulation system other than the FM system, it is necessary to provide a preamble area in each track in order to take out an information reproducing clock. In order to take out a stable information reproducing clock, a preamble area of 10 to 20 bits is usually required. If preamble area of several tens of bits is provided in each track of the optical card, the data accommodation capacity is significantly reduced.

On the other hand, if an FM system is used, self-clocking is attained without the preamble area but the recording density is significantly reduced.

SUMMARY OF THE INVENTION

It is an object of the present invention to provide an information recording medium capable of storing a sufficient amount of information by a self-clocking modulation system, among others a self-clocking system which needs an area to produce an information reproducing clock, and an information reproducing method therefor.

In accordance with the information reproducing medium of the present invention, a plurality of tracks for recording information are arranged to form a band, and a plurality of such bands are arranged in a direction transverse to the direction of arrangment of the tracks. The track has no area for obtaining the information reproducing clock.

In accordance with the reproducing method for the information recording medium of the present invention, when information on one track of one band is to be reproduced, an information reproducing clock is derived from at least a portion the information on a track other than said one track, preferably a track adjacent to said one track.

DESCRIPTION OF THE PREFERRED EMBODIMENTS

Figure 4:
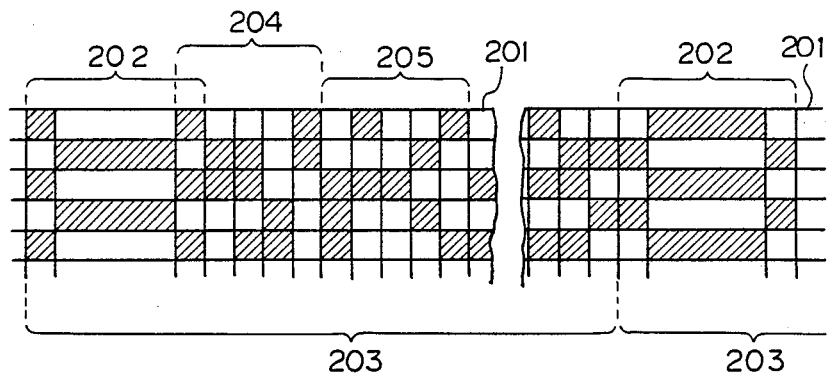
FIG. 4 shows a record format in one embodiment of an information recording medium of the present invention.

FIG. 4 shows a record format in one embodiment of the information recording medium of the present invention.

An information track 201 is separated from an adjacent information track in a direction of bit array by a separation area 202. A plurality of tracks each comprising the information track 201 and the separation area 202 are arranged to form a band 203. A plurality of such bands are arranged in both the longitudinal direction of the information track and a direction normal thereto, and a column of the separation areas 202 in the band 203 forms an R line to separate the adjacent information tracks.

The information track 201 comprises a number area 204 containing an information track number and a plurality of unit data areas 205.

Each unit data area 205 has five bits and a data contained therein is 4/5 converted by a conversion rule shown in the table shown below and NRZI modulated.

| Data | Code MSB LSB |
|---|---|
| 0 0 0 0 | 1 1 0 0 1 |
| 0 0 0 1 | 1 1 0 1 1 |
| 0 0 1 0 | 1 0 0 1 0 |
| 0 0 1 1 | 1 0 0 1 1 |
| 0 1 0 0 | 1 1 1 0 1 |
| 0 1 0 1 | 1 0 1 0 1 |
| 0 1 1 0 | 1 0 1 1 0 |
| 0 1 1 1 | 1 0 1 1 1 |
| 1 0 0 0 | 1 1 0 1 0 |
| 1 0 0 1 | 0 1 0 0 1 |
| 1 0 1 0 | 0 1 0 1 0 |
| 1 0 1 1 | 0 1 0 1 1 |
| 1 1 0 0 | 0 1 1 1 0 |
| 1 1 0 1 | 0 1 1 0 1 |
| 1 1 1 0 | 0 1 1 1 0 |
| 1 1 1 1 | 0 1 1 1 1 |

Figure 5:
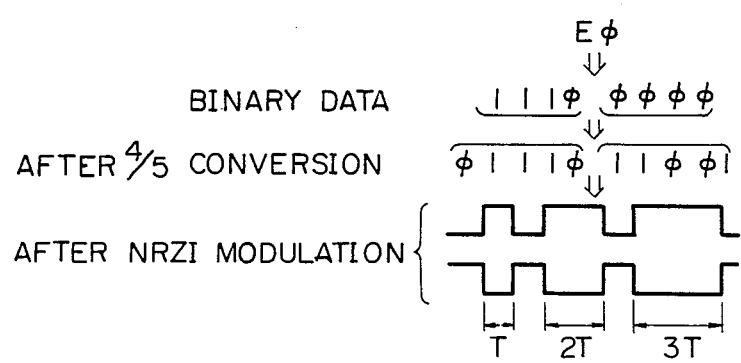
FIG. 5 illustrates a 4/5 modulation system used in the embodiment.

FIG. 5 illustrates the 4/5 NRZI modulation system used in the present embodiment. As shown therein, a hexadecimal data E$\phi$ is 4/5 converted and NRZI modulated. The NRZI modulated signal includes only T, 2T and 3T length signals, where T is a minimum reversal interval of the signal and corresponds to one bit in the record format shown in FIG. 4. The information recorded on the information track 201 does not include the reversal interval of 4T or longer.

In the present embodiment, an area having the reversal interval of 4T or longer is used as the separation area 202 to separate the information tracks. For example, as shown in FIG. 4, two separation signals "100001" and "011110" are alternatively recorded in the separation areas 202 in the tracks along the read direction or array direction of the information tracks. The separation tracks are not limited to those but may be any code which can be distinguished when it is read.

The information track 201 has the 5-bit number area 204 and 15 5-bit data areas 205 and for a total of 80 bits, and has no preamble area to generate a self-clock for reproduction. The 5-bit number area 204 is one of 0 to 7 in hexadecimal notation, or "11001" to "10111" in the 4/5 converted codes. There are two reasons for this. One is because the number of bits used for the track number may be small. The other is because the MSB of the 4/5 converted code of the track number is always "1" and the signal is reversed only for "1" in the NRZI modulation system, and hence the LSB (sixth bit) of the separation area 202 and the MSB (first bit) of the number area 204 may be commonly used and the number of bits can be reduced. More particularly, such is possible because the signal of the LSB of the separation area 202 is the reverse of the signal of the penultimate bit of the separation area 202, i.e., the former is "1" when the latter is "0", and vice versa.

Because the track has no preamble area and the number of bits other than data bits is small, more data can be stored in the information track 201 of the present invention.

Figure 1:
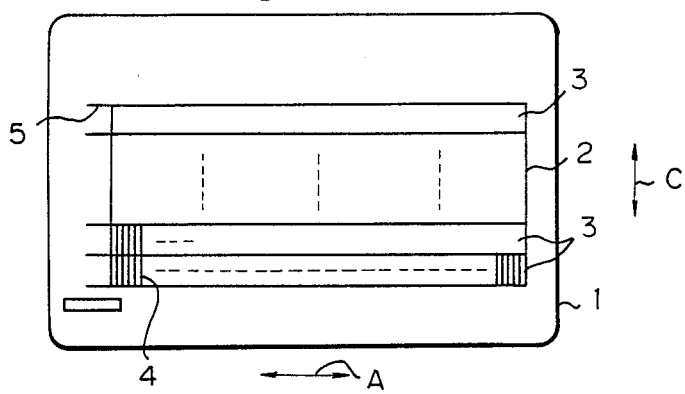
FIG. 1 is a plan view showing a record format in a prior art optical card.
Figure 2:
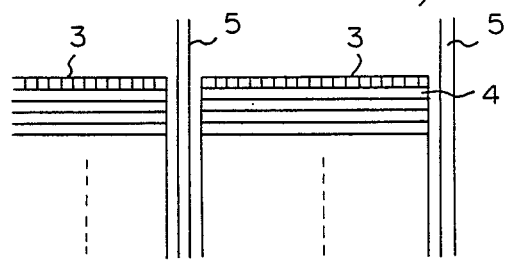
FIG. 2 is a partial enlarged view of the prior art record format.
Figure 3:
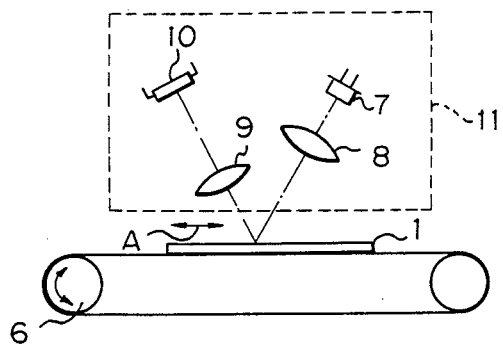
FIG. 3 shows a schematic configuration of an optical card reproducing apparatus.
Figure 6:
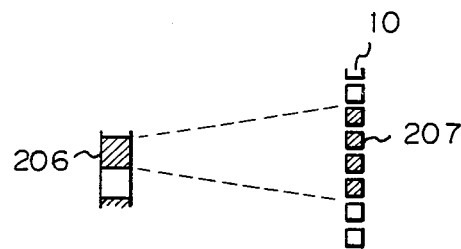
FIG. 6 shows a relationship between a sensor array and an optical card.

An embodiment for reproducing the above information recording medium will now be explained. An optical card is used as the information recording medium having the record format shown in FIG. 4, and the reproducing apparatus shown in FIG. 3 is used as the apparatus to read the information from the optical card. As shown in FIG. 6, in the present embodiment, an optical magnification is selected such that one bit 206 in the record area of the optical card is focused onto four cells 207 of the linear sensor array 10. For example, when the size of one bit 206 of the optical card is 10 $\mu$m and the size of the cell 207 of the linear sensor array 10 is 15 $\mu$m, the focusing optical system 9 has a magnification of $4 \times 15/10 = 6$.

Figure 7:
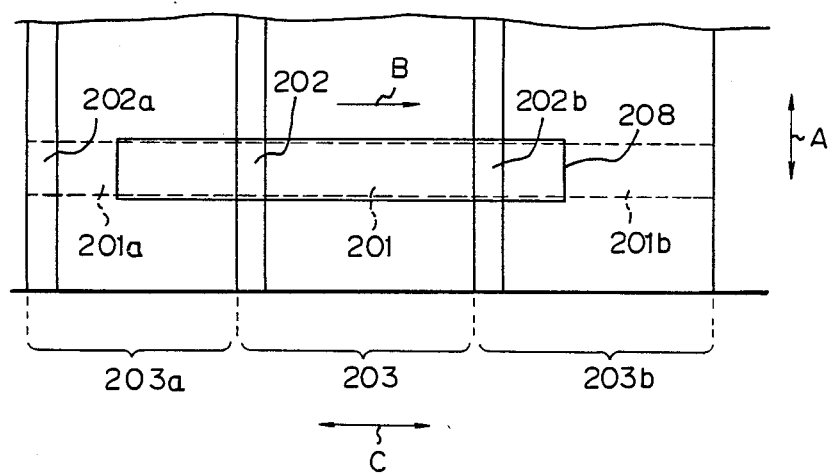
FIG. 7 shows one embodiment of a reproducing method of the present invention.

FIG. 7 illustrates an embodiment for reproducing the information recording medium of the present invention.

As shown in FIG. 7, the band 203, bands 203a and 203b adjacent to the band 203, information tracks 201, 201a and 201b of the bands and separation areas 202, 202a and 202b for separating the information tracks are formed in the record area on the optical card, in a format shown in FIG. 7. Since one bit of the separation area (6 bits) and one bit of the information track (80 bits) are commonly used, one track comprises a total of 85 bits. Thus, one band of track is focused onto 340 cells 207 on the sensor array 10.

In the present embodiment, a CCD having 512 cells 207 is used as the linear sensor array and the read area 208 is set such that portions of the information tracks 201a and 201b adjacent to the information track 201 which is the object to be read are also focused onto the sensor array 10.

By arranging such a read area 208, a reproducing clock can be taken out without forming a preamble area for generating the self-clock in the information track 201 which is the object to be read. When the sensor array 10 scans the read area 208 in the direction of the arrow B, the reproducing clock is taken out of a portion of the information on the information track 201a. Upon detection of the separation area 202, the information recorded on the information track 201 is reproduced by the taken-out clock, and upon detection of the separation area 202b, the reproduction of the information is stopped.

A reproducing apparatus which embodies the reproduction method of the information on the optical card of the present invention will now be explained.

Figure 8:
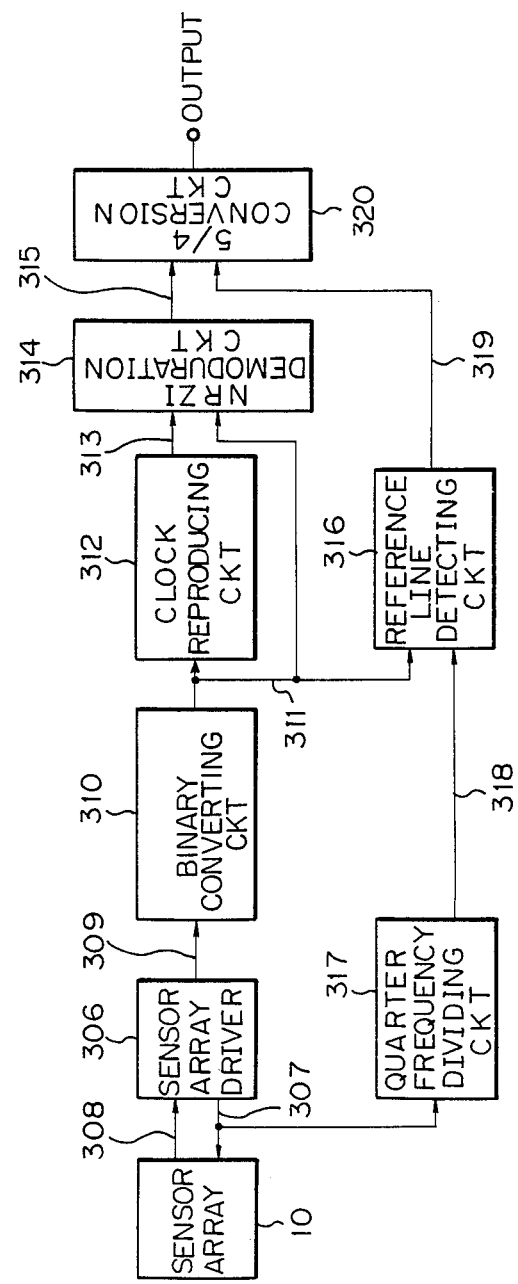
FIG. 8 is a block diagram of an optical card reproducing apparatus which embodies the reproducing method of the embodiment.

FIG. 8 shows a block diagram of an optical card reproducing apparatus which embodies the reproducing method of the present invention.

A sensor array 10 having a read area 208 is driven by a drive clock from a sensor array driver 306, and an output signal 308 from the sensory array 10 is amplified by the driver 306, which supplies a video signal 309 to a binary converting digitizing, or circuit 310. The digitized, or binary, video signal from the binary converting circuit 310 is supplied to a clock reproducing circuit 312, an NRZI demodulator 314 and an R line detector 316 as an NRZI signal 311.

The clock reproducing circuit 312 takes out a clock signal 313 from the NRZI signal 311 and supplies it to the NRZI signal demodulator 314. The NRZI demodulator 314 receives the clock signal 313 and the NRZI signal 311 and supplies an NRZ signal 315 which is a demodulated signal to a 5/4 conversion circuit 320. On the other hand, the R line detector 316 receives from a ¼ frequency divider 317 a clock signal 318 which is one quarter of the frequency of the drive clock 307, and the NRZI signal 311 from the binary converting circuit 310 and supplies an R line detection signal 319 to the 5/4 converter 320. The 5/4 converter 320 5/4 converts the NRZ signal 315 in accordance with the R line detection signal 319.

Figure 9:
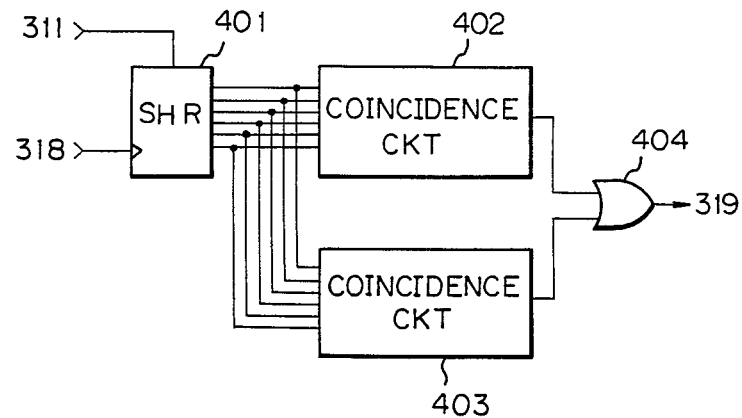
FIG. 9 is a block diagram of a reference line detector.

FIG. 9 is a block diagram of the R line detection circuit 316. The NRZI signal 311 is applied to a serial input terminal of a shift register 401, and the ¼ frequency-divided clock signal 318 is applied to a clock input terminal. Six-bit parallel output terminals of the shift register 401 are connected to input terminals of a "100001" coincidence circuit 402 and "011110" coincidence circuit 403, and output terminals of those coincidence circuits 402 and 403 are connected to input terminals of an OR circuit 404. The OR circuit 404 supplies the R line detection signal 319 to the 5/4 converter 320.

Specific operation of the reproducing apparatus will now be explained with reference to FIGS. 4 and 7.

As the sensor array 10 scans the read area 208 by the drive clock 307 in the direction of the arrow B, the NRZI signal 311 is the signal read from a portion of the adjacent information track 201a. Since this signal includes only the reversal intervals of T, 2T and 3T in nature, the clock signal 313 may be reproduced by taking out the minimum reversal interval T by the clock reproducing circuit 312 which includes a PLL circuit. The NRZI signal 311 is demodulated to the NRZ signal 315 by the demodulator 314. However, the 5/4 converter 320 does not operate until the first R line detection signal 319 is inputted. Bit signals from the read area 208 are sequentially supplied to the shift register 401 of the R line detection circuit 316 so that six bit signals are always registered therein. Accordingly, unless the content of the shift register 401 is equal to the content of the separation area 202 or 202b, that is, "100001" or "011110", the R line detection signals 319 is not produced.

As the 6-bit information ("100001") of the first separation area 202 is stored in the shift register 401, the R line detection signal 319 is produced by the coincidence circuit 402 through the OR circuit 404 so that the 5/4 converter 320 starts the conversion. Thus, the NRZ signal 315 corresponding to the information on the information track 201 which is the object to be read is 5/4 converted and outputted as the reproduced signal.

As the information ("011110") of the next separation area 202b is stored in the shift register 401, the R line detection signal 319 is produced from the coincidence circuit 403 through the OR circuit 404 and the 5/4 converter 320 stops to produce the reproduced signal.

In this manner, the information on the information track 202 which is the object to be read is reproduced by the self-clock. Similarly, as the optical card is moved in the direction of the arrow A and/or the optical head 11 which carries the sensor array 10 is moved in the direction of the arrow C, the desired information track is selected as the object to be read and the information thereon is reproduced.

Since the scan of the sensor array 10 and the relative movement of the optical card to the sensor arary 10 are asynchronous, one information track may be scanned several times depending on the selection of the scan speed of the sensor array 10 in the direction of the arrow B and the speed of movement of the optical card in the direction of A or C. For example, when a frequency F of the clock 307 which drives the sensor array 10 having 512 cells is 10 MHz, the speed V of the movement of the optical card is 40 mm/sec and the length L of one bit of the optical card is 10 $\mu$m, the number S of times of scans per information track is $S=(L/V)/(1/F\times512)=4.88$ Accordingly, while a single track may be scanned several times, it is necessary to detect the movement of the optical card to the next information track.

Figure 10:
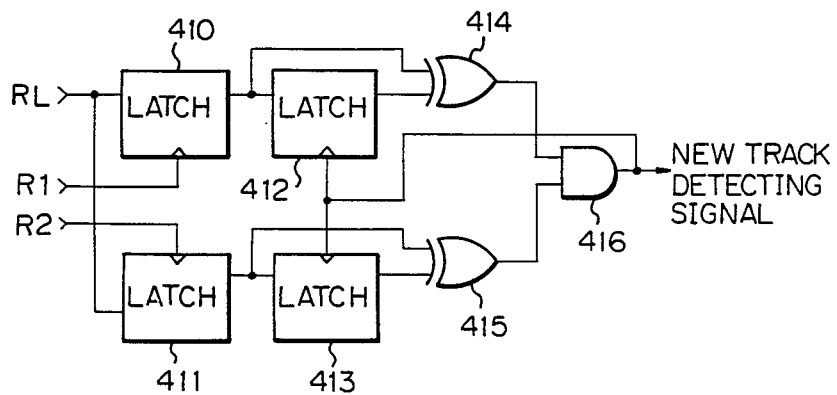
FIG. 10 is a block diagram of a new track detector used in the embodiment.

FIG. 10 shows a block diagram of a new track detector used to detect movement of the optical card to the next information track in the reproducing apparatus.

Any one bit or a plurality of bits from the parallel output terminals of the shift register 401 are supplied to latch circuits 410 and 411 as a signal RL. A latch pulse R1 of the latch circuit 410 is the first R line detection signal 319 or a pulse of the same timing, and the content of the first separation area 202 is represented by the signal RL in response to the latch pulse R1 and it is latched in the latch circuit 410. A latch pulse R2 of the latch circuit 411 is the next R line detection signal 319 or a pulse of the same timing, by which the content of the next separation area 202b is represented by the signal RL and it is latched in the latch circuit 411. The contents of the corresponding separation areas for the information track previously read have been latched in the latch circuits 412 and 413. The outputs of the latch circuits 410 and 412 are supplied to an exclusive OR circuit 414, and the output of the latch circuit 411 and 413 are supplied to an exclusive OR circuit 415. The outputs of the exclusive OR circuits 414 and 415 are supplied to an AND circuit 416, which produces a new track detection signal. The output of the AND circuit 416 is also used as a latch pulse to the latch circuits 412 and 413, which latch the contents latched in the latch circuits 410 and 411 into the latch circuits 412 and 413 for subsequent detection of a new track.

As described above, the contents of the separation areas are "100001" and "011110" which are alternately recorded in the read direction of the information track and the array direction. Accordingly, each time the new information track appears, the contents of the latch circuits 410 and 412 are different from each other and the contents of the latch circuits 411 and 413 are different from each other, and the outputs of the exclusive OR circuits 414 and 415 are "1" and the new track detection signal is produced from the AND circuit 416. It informs a control circuit (not shown) that the sensor array 10 scans a new information track.

While the 4/5 NRZI modulation system has been described in the present embodiment, the present invention is applicable to any self-clocking modulation system which necessitates an area for generating an information reproducing clock, such as MRM or EFM modulation system.

The adjacent area used to take out the reproducing clock may be a whole adjacent information track or an area over a plurality of bands.

The present invention is also applicable to a photomagnetic recording medium is which directions of magnetization are reversed, or a recording medium which used uneven bits.

As described hereinabove, the information recording medium of the present invention does not include the area in the information track which area is to be used only to generate the information reproducing clock. Accordingly, a large quantity of information can be recorded on the information recording medium, even though information recording is conducted using a self-clocking modulation system that requires a special area for generating the information reproducing clock.

The reproducing method for the information recording medium of the present invention takes out the information reproducing clock by using the information in at least a portion of the area adjacent to the information track which is the object to be read. Thus, the information recording medium may have a high capacity. Further, since the precision in manufacturing the optical system and the precision for position adjustment need not be high, the manufacturing process is simplified and cost is reduced.

We claim:

1. An apparatus for reproducing information from an information track having information recorded thereon by a self-clocking modulation system, comprising:
   sensor means for receiving a projection of an information track desired to be read and at least a portion of an information track other than said desired information track;
   means for producing a reproducing clock from a signal received by said sensor means from said portion of said information track other than said desired information track; and
   means for reproducing information received by said sensor means from said desired information track using said reproducing clock.

2. An information reproducing apparatus according to claim 1 wherein said information track other than said desired information track is adjacent to said desired information track.

3. A method for reproducing information from an information track having the information recorded thereon by a self-clocking modulation system, comprising the steps of:
   producing a reproducing clock from an information track other than the desired information track from which said information is to be read; and
   reading out said information from said desired information track by using said reproducing clock.

4. A method for reproducing information from an information track having the information recorded thereon by a self-clocking modulation system, comprising the steps of:
   projecting a desired information track to be read and at least a portion of an information track adjacent to said desired information track to a read sensor;
   producing a reproducing clock from a signal of said adjacent information track detected by said read sensor; and
   reproducing the information of said desired information track by using said reproducing clock.

5. An information recording medium comprising:
   a plurality of information tracks each of which extends in a first direction, said plurality of information tracks being arranged in a second direction thereby forming a band, said second direction being perpendicular to said first direction, said plurality of information tracks being adapted to have information recorded thereon which is read in the second direction, said recording medium including at least two bands arranged in said first direction; and
   a separation area provided between said at least two bands,
   wherein at least information other than that for generating an information reproducing clock is recorded in a portion of an information track adjacent said separation area, said portion is usable for generating said information reproducing clock for an information track adjacent said information track having said portion.

6. An information recording medium according to claim 5 wherein said information track includes an area for distinguishing said information track from another track.

* * * * *

UNITED STATES PATENT AND TRADEMARK OFFICE
CERTIFICATE OF CORRECTION

PATENT NO. : 4,853,920
DATED : August 1, 1989
INVENTOR(S) : HIDEKI HOSOYA, ET AL.

It is certified that error appears in the above-identified patent and that said Letters Patent is hereby corrected as shown below:

IN THE DRAWING,

Sheet 4, Fig. 8, "DEMODURATION" should read --DEMODULATION--.

COLUMN 2, line 8, "preamble" should read --a preamble--;

line 34, "portion" should read --portion of--.

COLUMN 3, line 13, "a conversion" should read --the conversion--;

line 31, "31101     should read --01101
          31110"                  01110--;

line 54, "and" (second occurrence) should be deleted.

COLUMN 4, line 61, "binary converting digitizing, or circuit 310." should read --digitizing, or binary converting, circuit 310.--.

COLUMN 5, line 42, "signals" should read --signal--;

line 56, "to produce" should read --producing--;

line 66, "arary" should read --array--.

COLUMN 6, line 34, "output" should read --outputs--;

line 68, "used" should read --uses--.

UNITED STATES PATENT AND TRADEMARK OFFICE
CERTIFICATE OF CORRECTION

PATENT NO. :   4,853,920

DATED      :   August 1, 1989

INVENTOR(S) :  HIDEKI HOSOYA, ET AL.

It is certified that error appears in the above-identified patent and that said Letters Patent is hereby corrected as shown below:

COLUMN 8, line 34, "area, said" should read --area, and said--.

Signed and Sealed this

Third Day of July, 1990

*Attest:*

HARRY F. MANBECK, JR.

*Attesting Officer*    *Commissioner of Patents and Trademarks*